United States Patent
Braune et al.

[11] Patent Number: 6,162,853
[45] Date of Patent: Dec. 19, 2000

[54] METHOD FOR PRODUCING A SHAPED PIECE SUITABLE FOR OPTICAL PURPOSES

[75] Inventors: Bert Braune, Voelklingen; Elisabeth Geiter, Saarbruecken; Herbert Krug, Puettlingen; Peter Mueller, Illingen; Helmut Schmidt, Saarbruecken-Guedingen, all of Germany

[73] Assignee: Institut fuer Neue Materialien Gemeinnuetzige GmbH, Saarbruecken, Germany

[21] Appl. No.: 09/230,358
[22] PCT Filed: Jul. 24, 1997
[86] PCT No.: PCT/EP97/04020
  § 371 Date: Jan. 25, 1999
  § 102(e) Date: Jan. 25, 1999
[87] PCT Pub. No.: WO98/04604
  PCT Pub. Date: Feb. 5, 1998

[30] Foreign Application Priority Data

Jul. 25, 1996 [DE] Germany .......................... 196 30 100

[51] Int. Cl.⁷ ...................................................... C08K 3/10
[52] U.S. Cl. .......................... 524/431; 524/437; 524/432; 526/279; 526/178; 522/71; 522/172; 528/32; 528/39; 264/331.15; 264/1.32
[58] Field of Search ..................................... 524/431, 432, 524/437; 526/279, 178; 522/71, 172; 528/32, 39; 264/331.15, 1.32

[56] References Cited

U.S. PATENT DOCUMENTS

| | | | |
|---|---|---|---|
| 4,455,205 | 6/1984 | Olson et al. | 522/44 |
| 4,715,999 | 12/1987 | Dislich et al. | 264/1.1 |

FOREIGN PATENT DOCUMENTS

| | | |
|---|---|---|
| 0 402 466 | 12/1990 | European Pat. Off. |
| 2 111 241 | 6/1983 | United Kingdom . |
| 2 129 005 | 5/1984 | United Kingdom . |
| 2 167 341 | 5/1986 | United Kingdom . |

*Primary Examiner*—Robert Dawson
*Assistant Examiner*—Kuo-Liang Peng
*Attorney, Agent, or Firm*—Oblon, Spivak, McClelland, Maier & Neustadt, P.C.

[57] ABSTRACT

Described is a process for preparing a molding suitable for optical purposes, which process comprises the conjoint free-radical polymerization of a precondensate (A) which is derived from at least one hydrolytically condensable silane (a) having at least one free-radically polymerizable group X, and of a monomer (B) having at least two free-radically polymerizable groups Y, the numerical ratio of groups X to groups Y being not greater than 5:1. The moldings obtainable by this process are characterized by high transparency and homogeneity, freedom from stress, scratch and abrasion resistance, high mechanical strength, etc.

22 Claims, No Drawings

METHOD FOR PRODUCING A SHAPED PIECE SUITABLE FOR OPTICAL PURPOSES

The present invention relates to a process for preparing a moulding suitable for optical purposes, for example a moulding which, possibly after appropriate machining and/ or processing (for example sawing, milling, grinding, polishing, etc.), can be employed as it is (i.e. without further coating etc.) as a lens for spectacles, a camera and the like.

Mouldings which are to be employed for optical purposes are required to meet a range of highly differing requirements. They should, for example, be transparent, scratch- and abrasion-resistant, mechanically stable, free from stress and also resistant to high-energy light adjustable (e.g. high) refractive index. Furthermore, they should be homogeneous and should preferably be preparable in a simple manner from readily available (inexpensive) starting materials. Since, however, it is difficult to provide materials which meet all of these requirements, it is generally the case that one makes do with being forced to accept, or by means of additional process steps to compensate for, the lack or the paucity of one or other property. For example, materials of inadequate scratch and abrasion resistance that are to be employed for optical purposes are thus frequently provided with a coating which compensates for this deficit of the material. From an economic standpoint (additional time and expense), however, this is not a desirable state of affairs.

DE-A-32 44 877 relates to a silicone-containing contact lens material and to contact lenses produced therefrom. The contact lens material comprises oligomers or polymers of defined structure and composition that are prepared, for example, by condensing a hydrolysable silane having a free-radically polymerizable group (for example γ-methacryloxypropyltrimethoxysilane) with other hydrolysable silanes and that have at least two free-radically polymerizable groups but no longer have any groups capable of further hydrolytic condensation (for example alkoxy groups attached to silicon) (and are therefore no longer capable of any inorganic crosslinking through the formation, for example, of —O—Si—O— bonds). (Preferably hard) contact lenses are produced from these materials, referred to as organoylsiloxanes, by adding a free-radical initiator and thermally polymerizing the free-radical polymerizable groups that are present. If desired, in this polymerization, it is also possible for unsaturated monomers, for example methyl methacrylate and methacrylic acid, to be present. According to Example 5 of this document, 7 days are required to prepare a moulding which can be processed further into contact lens blanks. Nevertheless, high refractive indices, for example, can not be achieved by this route. Instead, advantageous properties cited for the resulting mouldings are good impact strength, reduced brittleness and satisfactory oxygen permeability.

EP-A-78548 describes silicic acid heteropolycondensates and their use for optical lenses, especially contact lenses. These heteropolycondensates are obtainable by subjecting (a) at least one titanium or zirconium compound which is soluble in the reaction medium and is fully hydrolysable and (b) at least one particular organofunctional silane and also (c) particular optional components to precondensation in the absence of water and in the presence or absence of an anhydrous solvent and then to further condensation by addition of water, using—based on the overall number of moles of the starting components—from 1 to 60 mol per cent of component (a) and from 20 to 99 mol per cent of component (b). Concrete examples of compounds of component (a) are titanium and zirconium tetraalkoxides, while specific examples of organo-functional silanes (b) are 3-glycidyloxypropyltrialkoxysilanes and 3-methacryloyloxypropyltrialkoxysilanes. The heteropolycondensates prepared as described are subjected, for the purpose of preparing mouldings, to thermal curing by condensation of the remaining condensable groups still present. In accordance with a specific embodiment it is also possible to polymerize heteropolycondensates which have free-radically polymerizable groups, also in the presence of a free-radical initiator, for example with themselves or with at least one monounsaturated copolymerizable monomer (preferably hydrophilic in nature). It is also indicated that this (co)polymerization can be conducted if desired in the presence of a polyunsaturated compound (for example a (meth)acrylic ester of an alkylene glycol) as crosslinking agent, the amount of crosslinking agent being preferably from 0.1 to 10 mol per cent, in particular from 0.1 to 5 mol per cent, based on the overall number of moles of the copolymer. Particular advantages of the mouldings obtainable in this way are said to be high oxygen permeability and satisfactory hydrophilic character (good wettability). The mouldings are also ascribed high mechanical and dimensional stability, good elasticity and high surface hardness; however, these properties have not been demonstrated experimentally.

Consequently there continues to be a need for a material which can be employed for optical purposes and which as it is exhibits to a high extent the properties that are necessary and/or desirable for optical materials and which were specified at the outset (and other such properties as well).

The object of the present invention is therefore to provide a moulding suitable for optical purposes, which can preferably be prepared from readily available and therefore inexpensive starting materials, and which as far as possible has all of the abovementioned properties. In particular, the moulding should be inherently scratch resistant, highly stable mechanically and free from stress, the latter property making it possible to prepare large-sized mouldings. In addition, the refractive index of the moulding should be adjustable as required (for example high), and it should of course have excellent transparency.

The above object is achieved in accordance with the invention by a process for preparing a moulding suitable for optical purposes, which comprises the conjoint free-radical polymerization of a precondensate (A) which is derived from at least one hydrolytically condensable silane (a) having at least one free-radically polymerizable group X, and of a monomer (B) having at least two free-radically polymerizable groups Y, the numerical ratio of groups X to groups Y being not greater than 5:1.

According to a preferred embodiment of the present invention, the above free-radical polymerization of the precondensate (A) and of the monomer (B) takes place in the presence of nanoscale particles (C) of a metal compound, especially a metal oxide.

In the text below the starting materials (A), (B) and (C) are first of all described in more detail.

The precondensate (A) is derived from at least one hydrolytically condensable silane (a) having at least (and preferably) one free-radically polymerizable group X. The silane (a) preferably has the general formula (I):

$$X-R^1-SiR_3^2 \qquad (I)$$

in which X is $CH_2=CR^3-COO$ or $CH_2=CH$, $R^3$ is hydrogen or methyl, $R^1$ is a divalent hydrocarbon radical having 1 to 20, preferably 1 to 10 and, in particular, 1 to 6 carbon atoms, which if desired comprises one or more heteroatom groups (e.g. O, S, NH) which separate adjacent carbon atoms from one another, and the radicals $R^2$, identical or different from one another, are selected from alkoxy, aryloxy, acyloxy and alkylcarbonyl groups and halogen atoms (especially F, Cl and/or Br).

The groups $R^2$ are preferably identical and are selected from halogen atoms, $C_{1-4}$-alkoxy groups (e.g. methoxy, ethoxy, n-propoxy, i-propoxy and butoxy), $C_{6-10}$-aryloxy groups (e.g. phenoxy), $C_{1-4}$-acyloxy groups (e.g. acetoxy and propionyloxy) and $C_{2-10}$-alkylcarbonyl groups (e.g. acetyl).

These radicals $R^2$ can if desired carry substituents, for example halogen and alkoxy groups, although this is not preferred.

Particularly preferred radicals $R^2$ are $C_{1-4}$-alkoxy groups and, in particular, methoxy and ethoxy.

The radical $R^1$ is preferably an alkylene group, especially one having 1 to 6 carbon atoms, such as ethylene, propylene, butylene and hexylene, for example. If X is $CH_2=CH$, $R^1$ is preferably methylene and can in this case also denote just a bond.

X is preferably $CH_2=CR^3-COO$, where $R^3$ is preferably $CH_3$.

Accordingly, particularly preferred silanes (a) are (meth)acryloyloxyalkyltrialkoxysilanes, for example 3-methacryloyloxypropyltrimethoxysilane.

Although the precondensate (A) can be prepared 100% from the silane (a) it is also possible to replace up to 95 and, in particular, up to 90 mol-% of the silane or silanes (a) by other hydrolytically condensable silicon compounds. The latter compounds are preferably silanes (b) without a group X, which have the general formula (II):

$$R_a^4 SiR^2_{(4-a)} \qquad (II)$$

in which a is 0, 1, 2 or 3, preferably 1 or 2, $R^2$ is as defined above for formula (I), and the radicals $R^4$, identical or different from one another, are hydrocarbon radicals having 1 to 20, preferably 1 to 10 and, in particular, 1 to 6 carbon atoms, which can contain one or more heteroatom groups (e.g. O, S, NH) each of which is located between two adjacent carbon atoms. If desired, the radicals $R^4$ can also carry one or more substituents, especially those selected from the group consisting of halogen (especially F, Cl and/or Br), ($C_{1-4}$-)alkyl, $OCOR^5$, $COOR^5$, $COR^5$, $N(R^5)_2$ ($R^5$=alkyl having 1 to 6 carbon atoms or phenyl), $NO_2$, epoxy and hydroxyl.

Preferred hydrocarbon radicals $R^4$ are (preferably unsubstituted) alkyl, aryl, alkaryl and aralkyl radicals, especially $C_{1-4}$-alkyl (e.g. methyl and ethyl) and phenyl.

If a silane (b) is employed the molar ratio of silane(s) (a) to silane(s) (b) is preferably greater than 1:5, in particular greater than 1:3 and, with particular preference, greater than 1:1.

In addition to hydrolysable silicon compounds the precondensate (A) can also be derived from hydrolysable compounds of elements other than silicon (for example titanium and zirconium), in which case such compounds preferably make up not more than 10 and, in particular, not more than 5 mol-% of all of the hydrolysable starting compounds (on a monomeric basis) employed to prepare the precondensate (A). With particular preference, the precondensate (A) is derived exclusively from hydrolysable silicon compounds (e.g. the silanes (a) and (b)).

The preparation of the precondensate (A) from the hydrolysable starting compounds takes place in a manner known to the skilled worker, preferably in the presence of an acidic or basic condensation catalyst such as HCl, $HNO_3$ or $NH_3$. Otherwise, the preparation of the precondensate (A) is illustrated further in the working examples given below. In each case it is preferred for the precondensate to be a not too viscous liquid which can be mixed homogeneously with the monomers (b) and/or which dissolves (in part) therein.

The monomer (B) preferably comprises one or more compounds of the general formula (III)

$$(Y)_n-A \qquad (III)$$

in which

Y is $CH_2=CR^3-COZ$ n=2, 3 or 4, preferably 2 or 3 and, in particular, 2

Z=O or NH, preferably O;

$R^3$=H, $CH_3$;

A=an n-valent hydrocarbon radical having 2 to 30, in particular 2 to 20 carbon atoms, which can have one or more heteroatom groups, each of which is located between two adjacent carbon atoms (examples of such heteroatom groups are O, S, NH, NR (R=hydrocarbon radical), preferably O).

Furthermore, the hydrocarbon radical A can carry one or more substituents which are preferably selected from halogen (especially F, Cl and/or Br), alkoxy (especially $C_{1-4}$-alkoxy), hydroxyl, unsubstituted or substituted amino, $NO_2$, $OCOR^5$, $COOR^5$, $COR^5$ ($R^5=C_{1-6}$-alkyl or phenyl). Preferably, however, the radical A is unsubstituted or is substituted by halogen and/or hydroxyl.

In a particularly preferred embodiment of the present invention A is derived from an aliphatic diol, an alkylene glycol, a polyalkylene glycol or an optionally alkoxylated (for example ethoxylated) bisphenol (e.g. bisphenol A). Preferred alkylene glycols in this context are ethylene glycol, propylene glycol and butylene glycol, especially ethylene glycol.

In addition to the above groups Y, further groups Y which are preferred in accordance with the invention are vinyl and allyl groups. The groups Y need not of course be identical. For example, allyl (meth)acrylate is a compound suitable in accordance with the invention. Other examples of monomers (B) which are preferred for the purposes of the present invention are divinylbenzene and diallyl phthalate.

It is preferred in accordance with the invention if the groups X in the precondensate (A) and the groups Y in monomer (B) are identical groups.

The above numerical ratio of groups X to groups Y is generally not greater than 3:1, preferably not greater than 2:1 and, in particular, not greater than 1:1; particular preference is given to a ratio of not greater than 1:2.

Preferably, however, the above ratio is also not smaller than 1:20 and, in particular, not smaller than 1:10.

The monomer or monomers (B) preferably comprise(s) a liquid compound which can be mixed homogeneously with the precondensate (A) and/or which (in part) dissolves this precondensate.

In addition to the monomer or monomers (B) having at least (and preferably) two groups Y it is also possible for one or more monomers having one free-radically polymerizable group Y to be present in the free-radical polymerization, although this is not preferred. Examples of such monomers are (meth)acrylic esters derived, for example, from monohydric alcohols, and also styrene, vinyl acetate, etc. If such monomers are employed, their amount is preferably chosen such that not more than 10%, in particular not more than 5% and, with particular preference, not more than 2% of the groups Y that are present originate from these monomers.

According to a preferred embodiment of the present invention the conjoint free-radical polymerization of precondensate (A) and monomer (B) takes place in the presence of nanoscale particles (C) of a metal compound. If nanoscale particles are to be present they are generally in an amount of not more than 50% by weight, preferably not more than 30% by weight and, in particular, not more than 10% by weight, based on the overall amount (A)+(B)+(C).

By "nanoscale particles" are meant particles having an average size of not more than 100 nm, in particular not more than 50 nm and, with particular preference, not more than 20 nm. As far as the lower limit is concerned there are no particular restrictions, although this lower limit for practical reasons is generally 0.5 nm, in particular 1 nm and more frequently 2 nm.

The nanoscale particles can, for example, comprise oxides such as $ZnO$, $CdO$, $SiO_2$, $TiO_2$, $ZrO_2$, $CeO_2$, $SnO_2$, $Al_2O_3$, $In_2O_3$, $La_2O_3$, $Fe_2O_3$, $Cu_2O$, $V_2O_5$, $Nb_2O_5$, $Ta_2O_5$, $MoO_3$ or $WO_3$; chalcogenides, for example sulphides such as $CdS$, $ZnS$, $PbS$ or $Ag_2S$; selenides, such as $GaSe$, $CdSe$ or $ZnSe$; and tellurides, such as $ZnTe$ or $CdTe$; halides, such as $AgCl$, $AgBr$, $AgI$, $CuCl$, $CuBr$, $CdI_2$ or $PbI_2$; carbides, such as $CdC_2$ or $SiC$; arsenides, such as $AlAs$, $GaAs$ or $GeAs$; antimonides, such as $InSb$; nitrides, such as $BN$, $AlN$, $Si_3N_4$ or $Ti_3N_4$; phosphides, such as $GaP$, $InP$, $Zn_3P_2$ or $Cd_3P_2$; phosphates; silicates; zirconates; aluminates; stannates; and corresponding mixed oxides, for example those of perovskite structure (such as $BaTiO_3$ or $PbTiO_3$).

These nanoscale particles can be prepared by a customary method, for example by flame pyrolysis, plasma techniques, colloid techniques, sol-gel processes, controlled nucleation and growth processes, MOCVD techniques and emulsion techniques. These techniques and processes are described at length in the literature, as is the surface modification which may be performed on these nanoscale particles (for the purpose, for example, of compatibilization with components (A) and (B) and/or of adaptation to the chosen polymerization process).

The nanoscale particles can also be prepared in situ in the presence of the precondensate (A) and/or of the monomer (B), for example using sol-gel processes.

Nanoscale particles which are preferred in accordance with the invention are those of $TiO_2$ and/or $ZrO_2$ and/or $Ta_2O_5$. In particular when using $TiO_2$ nanoparticles, these particles are preferably subjected, prior to their use, to a surface modification (described in more detail in the examples) in order to protect the matrix against any possible photocatalytic effect of the $TiO_2$ (and thus against yellowing).

The concomitant use of nanoscale particles leads advantageously to an increase in the refractive index. Relatively high refractive indices can also be obtained by using monomers (B) of high molar refraction (e.g. bis-GMA). A combination of the measures just mentioned is also possible (see Example 16 below). In the latter case, the resultant refractive index of the moulding corresponds to the addition of the two individual measures for increasing the matrix refractive index.

The free-radical polymerization of the precondensate (A) and of the monomer (B) can be carried out in any manner familiar to the skilled worker, for example thermally, photochemically (for example with the aid of UV light) and/or by means of electron beams.

In accordance with the invention it is preferred for the free-radical polymerization to comprise a thermally initiated polymerization. In this case a thermal initiator (thermoinitiator) is preferably added to the polymerization mixture. Suitable thermal initiators include organic peroxides in the form of diacyl peroxides, peroxydicarbonates, alkyl peresters, dialkyl peroxides, perketals, ketone peroxides and alkyl hydroperoxides, and also azo compounds. Concrete examples of such thermal initiators are dibenzoyl peroxide, tert-butyl perbenzoate and azobisisobutyronitrile.

The polymerization initiator is usually employed in an amount of from 0.01 to 2, preferably from 0.01 to 0.2% by weight, in particular from 0.05 to 0.1% by weight, based on (A)+(B).

The polymerization temperature depends primarily on the decomposition temperature of the thermal initiator, but is preferably not higher than 135° C. and in particular, not higher than 110° C.

If a photochemical polymerization is intended, for example with the aid of UV rays, then a photoinitiator must be added prior to the polymerization. Photoinitiators which can be employed are, for example, the commercially available initiators. Examples of these are Irgacure® 184 (1-hydroxycyclohexyl phenyl ketone), Irgacure® 500 (1-hydroxycyclohexyl phenyl ketone, benzophenone) and other photoinitiators of the Irgacure® type obtainable from Ciba-Geigy; Darocur® 1173, 1116, 1398, 1174 and 1020 (obtainable from Merck), benzophenone, 2-chlorothioxanthone, 2-methylthioxanthone, 2-isopropylthioxanthone, benzoin, 4,4'-dimethoxybenzoin, benzoin ethyl ether, benzoin isopropyl ether, benzil dimethyl ketal, 1,1,1-trichloroacetophenone, diethoxyacetophenone and dibenzosuberone. The photoinitiator is employed in the same amounts as indicated above for the polymerization initiator.

According to a preferred embodiment of the present invention the free-radical polymerization is initiated either thermally or photochemically or a combination of photochemical curing with subsequent thermal curing is employed. The latter variant is particularly preferred.

The photochemical curing or, respectively, precuring is preferably carried out with substantial exclusion of oxygen. In addition, it is preferred to conduct photochemical curing in at least two stages, with the heat of polymerization being dissipated by cooling (for example at 0 to 5° C.) between successive stages.

The combination of photochemical curing and thermal postcuring has the advantage, for example, that the composition, after the (relatively rapid) photochemical curing to form a dimensionally stable but still relatively soft moulding, can be removed from the mould and subjected, outside the mould, to thermal postcuring, it thereby being possible to markedly shorten the usage times of the (in some cases very expensive) casting moulds. Typical curing times for the photochemical precuring are, for example, about 2 hours, whereas the thermal postcuring usually requires between 5 and 20 hours.

The process according to the invention can be conducted, for example, in such a way that the precondensate (A), the monomer (B) and, if desired, the nanoscale particles (C) and also photoinitiator and/or thermal polymerization initiator are mixed homogeneously, the resulting mixture is introduced into a mould, and free-radical polymerization is brought about by irradiation and/or heating. Directly before polymerization at the latest it is necessary to remove, as far as is possible, any volatile components present. Examples of such volatile components are water and volatile hydrolysis products from the preparation of the precondensate (A) and/or of the nanoscale particles (C) and also any volatile organic solvents added for the purpose of simplifying the mixing procedure.

If a coloured moulding is desired it is of course possible to add an appropriate colorant to the above mixture no later than prior to polymerization.

After the end of polymerization (curing) the moulding is removed from the mould (if this has not already been done following photochemical prepolymerization) and is transformed if desired, by means of appropriate machining and/or processing processes, into the desired ultimate moulding, for example a spectacle lens or a camera lens.

Since the process according to the invention leads to mouldings which, inter alia, are relatively free from stress, this process is also suitable in particular for preparing mouldings of relatively large dimensions, for example those having a volume of at least 1 cm$^3$, preferably at least 5 cm$^3$ and, in particular, at least 10 cm$^3$.

The process according to the invention has a series of advantages. In particular, the mouldings obtainable thereby are highly transparent, homogeneous, free from stress (and therefore also suitable for relatively large components), inherently scratch- and abrasion-resistant, and highly stable mechanically. Furthermore, especially when nanoscale particles (for example of $TiO_2$) are used, they possess in particular a variable (for example very high) refractive index, without the transparency being impaired as a result, and are quicker and easier to prepare than prior art mouldings which can be employed for optical purposes. When appropriately conducted, the process according to the invention leads in less than one day to the desired moulding having the above advantageous properties.

Owing to their intrinsic high scratch and abrasion resistance the mouldings obtainable in accordance with the invention do not, unlike customary transparent plastics, require any additional scratch-resistant coating in order to be employable for long-term service without significant reductions in quality; the omission of an entire process step saves considerable investment and operating costs; moreover, a risk factor inherent in production, that of producing rejects, is removed.

It is also possible in the process according to the invention to employ customary commercial starting compounds (silanes (a), (b), monomers (B)) which in general require no additional purification prior to their use. The only process step before the actual polymerization is the hydrolysis/condensation or cocondensation of the silane/silanes. Since the precondensates (A) can be stored for at least 14 days without undergoing changes in properties or structure, this does not give rise to any critical workflow problem in the process. As a consequence, high production costs are avoided without impairment to the quality of the product.

The production times necessary in accordance with the invention to a great extent permit industrial utilization of the process. By virtue of the early (preferred in accordance with the invention) removal from the mould (after the photopolymerization) the cycle times of the casting moulds, some of which are very expensive, are kept short and it is possible to use them a number of times per day.

The starting materials which can be employed in the process according to the invention, and the polymers which form therefrom, are, furthermore, toxicologically and ecologically unobjectionable. Since all of the monomers employed and their mixtures are preferably liquid up to the moment of polymerization, a simple procedure is possible (for gaseous or solid (insoluble) products a substantially greater expense would be necessary).

The present invention is explained in more detail below by means of examples, which serve merely for illustration.

In these examples, the following abbreviations are used:
MPTS=methacryloyloxypropyltrimethoxysilane
PTES=phenyltriethoxysilane
DMDES=dimethyldiethoxysilane
TEGDMA=tetraethylene glycol dimethacrylate
PEGDMA=polyethylene glycol(400) dimethacrylate
DDDMA=1,12-dodecanediol dimethacrylate
Bis-GMA=2,2-bis[4-(3'-methacryloyloxy-2'-hydroxy) propoxyphenyl]propane
AIBN=azobisisobutyronitrile

PREPARATION EXAMPLE 1

50.62 g of 0.1 molar hydrochloric acid are added to 465.61 g of MPTS (=1.875 mol) in a 1000 ml round-bottomed flask. The flask is fitted with a reflux condenser. The mixture is held at a temperature of 40±2° C. for 24 hours (after about 15 minutes, the inhomogeneous mixture becomes a single phase as a result of the methanol that has formed). Subsequently, over the course of 2.5 hours, the volatile constituents are removed by vacuum distillation at a maximum of 40° C. The viscous MPTS condensate is back-weighed and the weight is compared with the molar amount employed initially. For the subsequent calculations, the resulting molar weight per condensed MPTS unit is employed: back-weighing result=349.23 g, corresponding to a molecular weight (equivalent weight) of 186.28.

PREPARATION EXAMPLE 2

49.84 g of MPTS (0.201 mol) together with 68.96 g of PTES (0.287 mol) are mixed as in Preparation Example 1 with 13.25 g of 0.1 molar hydrochloric acid and the mixture is held at 40±2° C. for 24 hours. Subsequent processing is as in Preparation Example 1. Yield: 81.16 g of product.

PREPARATION EXAMPLE 3

376.60 g of MPTS (1.51 mol) together with 56.18 g of DMDES (0.38 mol) are mixed as in Preparation Example 1 with 48.02 g of 0.1 molar hydrochloric acid and the mixture is held at 40±2° C. for 24 hours. Subsequent processing is as in Preparation Example 1. Yield: 317.98 g of product.

EXAMPLE 1

19.02 g of precondensate from Preparation Example 1 and 33.01 g of TEGDMA are stirred up together with 0.0521 g of Irgacure® 184 and 0.0251 g of AIBN in the absence of UV light. The mixture is cooled down to 0° C. and then once again homogenized intensively using an Ultra-Turrax® stirrer. In a rotary evaporator most of the oxygen present is stripped off (residual pressure: 10 mbar) and then the reduced pressure is replaced by pure nitrogen until atmospheric pressure is reached (thereby removing disruptive gas bubbles). The mixture is then placed carefully into the prepared moulds (Teflon shells of different geometry: rod or pot with a volume of 10 cm$^3$) and subjected to photopolymerization in a Beltron® irradiation unit (lamp power consumption: 2500 watts; belt speed: 4 m/min.). Subsequently, the samples are stored in a freezer for 15 minutes. The procedure just described is repeated twice with the same lamp power, belt speed and intermediate cooling. The polymers obtained are compact and colourless, but still relatively soft. In this state, they are removed carefully from the casting moulds. Then a thermal postpolymerization is conducted with the following temperature programme: start at 60° C., 2-hour heating to 95° C., 14-hour hold at 95° C., then 5-hour cooling to 20° C.

The resulting polymers are transparent, colourless and hard. Some of their properties are given below in Table 1.

EXAMPLE 2

17.59 g of precondensate from Preparation Example 1 and 91.49 g of TEGDMA are stirred up together with 0.1091 g of Irgacure® 184 and 0.1062 g of AIBN in the absence of UV light and are then treated further as in Example 1.
Casting moulds: see Example 1.
Curing: 6 passes through the Beltron® irradiation unit as described in Example 1, but with a belt speed of 2 m/min.
Thermal curing: 24 hours at 90° C.

The resulting polymers are transparent, colourless and hard. Some of their properties are given below in Table 1.

EXAMPLE 3

3.33 g of the precondensate from Preparation Example 2 are stirred up together with 6.61 g of TEGDMA and 0.0082 g of Irgacure® 184 and 0.0040 g of AIBN in the absence of UV light and are then treated further as in Example 1.
Casting mould: pot (V=10 cm$^3$)
Curing: 5 passes through the Beltron® irradiation unit as described in Example 1, but with a belt speed of 3 m/min. (passes 1–3) and 2 m/min, respectively.
Thermal curing: start at 60° C., 2-hour heating to 95° C., 14-hour hold at 95° C. and 4-hour cooling to 20° C.

The resulting polymers are transparent, colourless and hard. Some of their properties are given below in Table 1.

EXAMPLE 4

(a) 31.30 g of precondensate from Preparation Example 1, 82.63 g of TEGDMA and 137.63 g of PEGDMA are stirred up together with 0.2513 g of Irgacure® 184 and 0.2610 g of AIBN in the absence of UV light and are then treated further as in Example 1.
Casting moulds: as in Example 1 and, additionally, a large pot (V=100 cm$^3$).
Curing: 4 passes through the Beltron® irradiation unit as described in Example 1, but with a belt speed of 3 m/min. (passes 1–3) or 1 m/min, respectively.
Thermal curing: 24 hours at 90° C.

The resulting polymers are transparent, colourless and hard. Some of their properties are given in Table 1.

(b) 30.18 g of precondensate from Preparation Example 1, 26.77 g of TEGDMA and 43.79 g of PEGDMA are stirred up together with 0.1500 g of Irgacure® 184 and 0.0784 g of AIBN in the absence of UV light and are then treated further as in Example 1.
Casting moulds: one rod, one large pot (V=100 cm$^3$).
Curing: 6 passes through the Beltron® irradiation unit as described in Example 1.
Thermal curing: 12 hours at 90° C.

The resulting polymers are transparent, colourless and hard. Some of their properties are given in Table 1.

(c) 7.22 g of precondensate from Preparation Example 1, 12.57 g of TEGDMA and 2.20 g of PEGDMA are stirred up together with 0.0220 g of Irgacure® 184 and 0.0127 g of AIBN in the absence of UV light and are then treated further as in Example 1.
Casting mould: small pot (V=10 cm$^3$).
Curing: 3 passes through the Beltron® irradiation unit as described in Example 1.
Thermal curing: start at 60° C., 2-hour heating to 95° C., 14-hour hold at 95° C. and 5-hour cooling to 20° C.

The resulting polymers are transparent, colourless and hard. Some of their properties are given in Table 1.

EXAMPLE 5

(a) 8.46 g of precondensate from Preparation Example 1, 7.45 g of TEGDMA and 7.61 g of DDDMA are stirred up together with 0.0237 g of Irgacure® 184 and 0.0119 g of AIBN in the absence of UV light and are then treated further as in Example 1.
Casting moulds: one rod, one small pot (V=10 cm$^3$)
Curing: 3 passes through the Beltron® irradiation unit as described in Example 1
Thermal curing: start at 60° C., 2-hour heating to 95° C., 54-hour hold at 95° C. and 5-hour cooling to 20° C.

The polymers are transparent, colourless and hard. Some of their properties are given in Table 1.

(b) 8.12 g of precondensate from Preparation Example 1, 40.00 g of TEGDMA and 2.20 g of DDDMA are stirred up together with 0.0250 g of Irgacure® 184 and 0.0240 g of AIBN in the absence of UV light and are then treated further as in Example 1.
Casting moulds: one rod, one large pot (V=100 cm$^3$) and also two glass substrates which are sealed by a sealing ring and separated from one another (V=10 cm$^3$).
Curing: 6 passes through the Beltron® irradiation unit as described in Example 1.
Thermal curing: 14 hours at 90° C.

The polymers are transparent, colourless and hard. Some of their properties are given in Table 1.

(c) 22.53 g of precondensate from Preparation Example 1, 79.31 g of TEGDMA and 40.57 g of DDDMA are stirred up together with 0.1420 g of Irgacure® 184 and 0.0689 g of AIBN in the absence of UV light and are then treated further as in Example 1.
Casting moulds: one rod, one small pot (V=10 cm$^3$) and also two glass substrates which are sealed off by a sealing ring and separated from one another (V=40 cm$^3$).
Curing: 4 passes through the Beltron® irradiation unit as described in Example 1 and two passes through the Beltron® irradiation unit as described in Example 1, but with a belt speed of 2 m/min.
Thermal curing: start at 45° C., 3-hour heating to 95° C., 14-hour hold at 95° C. and 4-hour cooling to 25° C.

The resulting polymers are transparent, colourless and hard. Some of their properties are given in Table 1.

EXAMPLE 6

8.45 g of precondensate from Preparation Example 1 and 15.21 g of DDDMA are stirred up together with 0.0118 g of Irgacure® 184 and 0.0073 g AIBN in the absence of UV light and are then treated further as in Example 1.
Casting moulds: one rod, one small pot (V=10 cm$^3$).
Curing: 3 passes through the Beltron® irradiation unit as described in Example 1.
Thermal curing: start at 60° C., 2-hour heating to 95° C., 54-hour hold at 95° C. and 5-hour cooling to 20° C.

The resulting polymers are transparent, colourless and hard.

EXAMPLE 7

(a) 3.62 g of precondensate from Preparation Example 1, 6.38 g of TEGDMA and 13.19 g of bis-GMA are stirred up together with 0.0075 g of Irgacure® 184 and 0.0091 g of AIBN in the absence of UV light and are then treated further as in Example 1.
Casting mould: small pot (V=10 cm$^3$)
Curing: 5 passes through the Beltron® irradiation unit as described in Example 1, but with a belt speed of 3 m/min. (passes 1–3) and with a belt speed of 1 m/min, respectively.
Thermal curing: start at 60° C., 2-hour heating to 95° C., 12-hour hold at 95° C. and 5-hour cooling to 20° C.

The resulting polymers are transparent, pale yellow and hard. Some of their properties are given in Table 1.

(b) 22.53 g of precondensate from Preparation Example 1, 79.29 g of TEGDMA and 13.50 g of bis-GMA are stirred up together with 0.1158 g of Irgacure® 184 and 0.0689 g of AIBN in the absence of UV light and are then treated further as in Example 1.

Casting moulds: one rod, one small pot (V=10 cm$^3$) and also two glass substrates which are sealed off by a sealing ring and separated from one another (V=40 cm$^3$).

Curing: 4 passes through the Beltron® irradiation unit as described in Example 1 and one pass through the Beltron® irradiation unit as described in Example 1, but with a belt speed of 2 m/min.

Thermal curing: start at 60° C., 5-hour heating to 95° C., 54-hour hold at 95° C. and 4-hour cooling to 20° C.

The resulting polymers are transparent, colourless and hard. Some of their properties are given in Table 1.

(c) 25.19 g of precondensate from Preparation Example 1, 87.27 g of TEGDMA and 67.48 g of bis-GMA are stirred up together with 0.1801 g of Irgacure® 184 and 0.0760 g of AIBN in the absence of UV light and are then treated further as in Example 1.

Casting moulds: one rod, one small pot (V=10 cm$^3$) and also two glass substrates which are sealed off by a sealing ring and separated from one another (V=40 cm$^3$).

Curing: 4 passes through the Beltron® irradiation unit as described in Example 1 and two passes through the Beltron® irradiation unit as described in Example 1, but with a belt speed of 2 m/min.

Thermal curing: start at 60° C., 5-hour heating to 95° C., 14-hour hold at 95° C. and 4-hour cooling to 25° C.

The resulting polymers are transparent, colourless and hard. Some of their properties are given in Table 1.

EXAMPLE 8

22.79 g of precondensate from Preparation Example 1, 87.23 g of TEGDMA, 24.86 g of bis-GMA and 16.23 g of DDDMA are stirred up together with 0.1510 g of Irgacure® 184 and 0.0690 g of AIBN in the absence of UV light and are then treated further as in Example 1.

Casting moulds: one rod, one small pot (V=10 cm$^3$) and also two glass substrates which are sealed off by a sealing ring and separated from one another (V=40 cm$^3$).

Curing: 4 passes through the Beltron® irradiation unit as described in Example 1 and two passes through the Beltron® irradiation unit as described in Example 1, but with a belt speed of 2 m/min.

Thermal curing: start at 60° C., 5-hour heating to 95° C., 14-hour hold at 95° C. and 4-hour cooling to 25° C.

Some properties of the resulting polymers are given in Table 1.

EXAMPLE 9

45.58 g of precondensate from Preparation Example 1, 190.30 g of TEGDMA, 26.42 g of PEGDMA and 32.46 g of DDDMA are stirred up together with 0.2945 g of Irgacure® 184 and 0.1382 g of AIBN in the absence of UV light and are then treated further as in Example 1.

Casting moulds: one rod, one small pot (V=10 cm$^3$) and also two glass substrates which are sealed off by a sealing ring and separated from one another (V=40 cm$^3$).

Curing: 4 passes through the Beltron® irradiation unit as described in Example 1 and two passes through the Beltron® irradiation unit as described in Example 1, but with a belt speed of 2 m/min.

Thermal curing: start at 60° C., 5-hour heating to 95° C., 4-hour hold at 120° C. and 4-hour cooling to 25° C.

Some properties of the resulting polymers are given in Table 1.

EXAMPLE 10

17.99 g of precondensate from Preparation Example 3 and 102.25 g of TEGDMA are stirred up together with 0.1200 g of Irgacure® 184 and 0.0326 g of AIBN in the absence of UV light and are then treated further as in Example 1.

Casting moulds: one rod, one small pot (V=10 cm$^3$) and also two glass substrates which are sealed off by a sealing ring and separated from one another (V=40 cm$^3$).

Curing: 4 passes through the Beltron® irradiation unit as described in Example 1 and two passes through the Beltron® irradiation unit as described in Example 1, but with a belt speed of 2 m/min.

Thermal curing: start at 60° C., 5-hour heating to 95° C., 14-hour hold at 95° C. and 4-hour cooling to 25° C.

Some properties of the resulting polymers are given in Table 1.

EXAMPLE 11

23.28 g of precondensate from Preparation Example 3, 111.67 g of TEGDMA and 17.60 g of DDDMA are stirred up together with 0.1523 g of Irgacure® 184 and 0.0747 g of AIBN in the absence of UV light and are then treated further as in Example 1.

Casting moulds: one rod, one small pot (V=10 cm$^3$) and also two glass substrates which are sealed off by a sealing ring and separated from one another (V=40 cm$^3$).

Curing: 4 passes through the Beltron® irradiation unit as described in Example 1 and two passes through the Beltron® irradiation unit as described in Example 1, but with a belt speed of 2 m/min.

Thermal curing: start at 60° C., 5-hour heating to 95° C., 14-hour hold at 95° C. and then 4-hour cooling to 25° C.

Some properties of the resulting polymers are given in Table 1.

EXAMPLE 12

23.28 g of precondensate from Preparation Example 3 and 111.67 g of TEGDMA and 28.62 g of PEGDMA are stirred up together with 0.1633 g of Irgacure® 184 and 0.0748 g of AIBN in the absence of UV light and are then treated further as in Example 1.

Casting moulds: one rod, one small pot (V=10 cm$^3$) and also two glass substrates which are sealed off by a sealing ring and separated from one another (V=40 cm$^3$).

Curing: 4 passes through the Beltron® irradiation unit as described in Example 1 and two passes through the Beltron® irradiation unit as described in Example 1, but with a belt speed of 2 m/min.

Thermal curing: start at 60° C., 5-hour heating to 95° C., 14-hour hold at 95° C. and 4-hour cooling to 25° C.

Some properties of the resulting polymers are given in Table 1.

All samples from Examples 1 to 12 can be machined by customary commercial means (sawing, milling, grinding, polishing, etc.) and can be coloured by means of water-soluble diffusion dyes.

In Table 1 below the following abbreviations are used: HU: Vickers hardness (N/mm$^2$); eR: elastic recovery (%); $a_n$: impact strength (kJ/m$^2$); $n_E$: refractive index at 546.1 nm; $V_E$: Abbé number; G: yellowness; α: thermal expansion coefficient ($10^{-6}$/K; measured between −50° C. and +50° C.)

TABLE 1

| | | | | Example No. | | | | | |
|---|---|---|---|---|---|---|---|---|---|
| | | | | | 4 | | | 5 | |
| | 1 | 2 | 3 | a | b | c | a | b | c |
| HU | 110 | 118 | 76 | | | | | 89 | 90 |
| eR | 78 | 66 | 66 | 74 | | 77 | | 58 | 73 |
| $a_n$ | | | 17.9 | 17 | 6.0 | | | 6.6 | 6.7 |
| $n_E$ | 1.5058 | 1.5083 | 1.5182 | 1.5029 | | | | 1.5077 | 1.5064 |
| $v_E$ | 55.6 | 55.8 | 49.0 | 54.3 | | | | 55.3 | 55.7 |
| G | -0.2 | | | 0.8 | | -0.9 | | | -1.6 |
| a | 85 | | | | | 99 | | | |

| | | | 7 | | | | | | |
|---|---|---|---|---|---|---|---|---|---|
| | 6 | a | b | c | 8 | 9 | 10 | 11 | 12 |
| HU | | 107 | 122 | 97 | | | 99 | | |
| eR | | 69 | 63 | 67 | | | 67 | | |
| $a_n$ | | 10 | 5 | 4.0 | | 5.5 | 7.3 | 5.9 | 10 |
| $n_E$ | 1.5435 | 1.5157 | 1.5320 | 1.5182 | | | 1.5082 | | |
| $v_E$ | 44.2 | 51.5 | 45.2 | 49.8 | | | 55.3 | | |
| G | | | | -0.5 | 1.2 | -0.6 | | | |
| a | | | | 76 | | | 92 | | |

EXAMPLE 13

5.59 g of precondensate from Preparation Example 1 and 9.91 g of TEGDMA are stirred up together with 0.0152 g of Irgacure® 184 in the absence of UV light and are then treated further as in Example 1.
Casting moulds: Teflon pot (V=10 cm³).
Curing: 4 passes through the Beltron® irradiation unit as described in Example 1 and one pass through the Beltron® irradiation unit as described in Example 1, but with a belt speed of 2m/min.
Thermal curing: start a t 45° C., 5-hour heating to 95° C., 14-hour hold at 95° C. and 4-hour cooling to 25° C.

The resulting polymers have a Vickers hardness of 73 N/mm² and an elastic recovery of 49%.

EXAMPLE 14

Example 13 is repeated but with the additional admixture of 0.0071 g of AIBN.
Vickers hardness: 90 N/mm², elastic recovery: 50%.

EXAMPLE 15

In the text below the use of nanoscale particles (c) is illustrated.
Procedure (a):

In all of the experiments 10 g of MPTS (distilled and subjected to acid hydrolysis beforehand with 1.5 times the stoichiometric amounts of 0.1N HCl) and 17.19 g of TEGDMA (deinhibited with 2% NaOH and dried) were stirred together for 15 minutes until homogeneous. Then 0.07 g (0.25% by weight) of thermal initiator (AIBN) and $TiO_2$-sol were added, after which the mixture was stirred for 15 minutes until homogeneous.

If sol was added, the solvent had to be removed from the polymerization.

The titanium oxide sol employed was prepared in accordance with the titanium oxide sol synthesis process of Yoldas with excess water using inorganic acid as stabilizer. Hydrolysis ratio between 1.5 and 4.6; particle sizes between 3.5 and 20 nm.
Procedure (b): (sol tio66, particle size 12 nm)

40 g of isopropanol and 0.75 g of HCl (fuming) and 0.74 g of $H_2O$ (double-distilled) were stirred together for 10 minutes. Then 2.5 g of titanium isopropanolate were added dropwise with stirring. All of the sols used were synthesized in accordance with this scheme.

Curing of the Composites

To avoid cracks in the course of polymerization, the following temperature programmed was observed for all of the composites:
Procedure (c):
12-hour heating from 51 to 55° C. (temperature ramp).
4-hour heating from 55 to 90° C. (temperature ramp).
12-hour hold at constant temperature (90° C.).

Experiments

E1: (matrix without titanium oxide)
Only matrix (procedure (a)) cured according to procedure (c)
$n_e$=1.507; Abbé number=55.
E2: (matrix with titanium oxide nanoparticles)
Matrix according to procedure (a); titanium oxide sol (3.6% by weight of $TiO_2$, based on overall amount of matrix (liquid)) added according to procedure (b).
Curing according to procedure (c).
The resulting composite shows a noticeable yellow coloration (yellowness according to DIN 6167:45).
E3: (matrix with aluminium oxide nanoparticles, without titanium oxide)
2% by weight of Al sec-butylate, based on the liquid matrix, are added to the matrix according to procedure (a), and curing is carried out according to procedure (c).
Composite is colourless, transparent and very homogeneous:
$n_e$=1.51; Abbé number=55.15.
E4: (matrix with titanium oxide nanoparticles which are coated with aluminium oxide)
Sol synthesis according to procedure (b); then addition of Al sec-butylate in a molar ratio of Al precursor/Ti precursor of 1:2 to the sol and stirring for 2 h. Addition of matrix according to procedure (a) and further Al sec-butylate as in E3. Curing according to procedure (c).
Markedly reduced yellowing (yellowness according to DIN 6167: 19).

More Effective Coating Procedure (d):

MPTS was added to the sol and the mixture was then stirred for 2 hours. The sol was then heated under reflux at 100° C. for 1 h.

E5: (matrix with titanium oxide nanoparticles with improved coating)

Matrix according to procedure (a); addition of modified sol (10% by weight of titanium oxide, based on liquid matrix) according to procedures (b) and (d); curing according to procedure (c) with addition of an additional 2% by weight of Al sec-butylate (based on pure matrix) as polymerization aid and under nitrogen. Negligible yellowing of the composite (yellowness according to DIN 6167:5).

E6: (matrix with titanium oxide nanoparticles which are coated with Si oxide and Al oxide)

Matrix. according to procedure (a). Sol of (b) was modified in accordance with procedure (d). Then the solvent was removed from the sol and the resulting powder was dissolved in isopropanol, and Al sec-butylate was added in a molar ratio Al/Ti=1/12. Stirring for 2 hours and removal of the solvent. Redissolution in isopropanol and introduction into the matrix (10% by weight of TiO$_2$ based on the matrix). Addition of 2% by weight of Al sec-butylate (based on the liquid matrix). 2 hours of stirring and curing according to procedure (c).

No yellowing was visible to the eye at layer thicknesses of 5 mm. Yellowness according to DIN 6167:3.

Refractive index and Abbé number as E7 (see below).

E7: (experiment E6 with photochemical prepolymerization)

Like E6, but 0.1% by weight of photoinitiator (Irgacure® 184) was additionally added to the liquid precursor (based on the matrix) and, after stirring for 15 minutes, the mixture was first prepolymerized photochemically and then thermally cured (according to procedure (c)).

n$_e$=1.530; Abbé number=45.

EXAMPLE 16

Moulding with matrix of high refractive index and with nanoscale surface-modified titanium oxide 1. Synthesis of Surface-modified TiO$_2$ 1.a.

Take 40 g of isopropanol (AR); add 0.75 g of fuming HCl and 0.74 g of double-distilled water and stir for 15 minutes until homogeneous. Add 2.5 g of titanium isopropanolate dropwise with stirring; after 45 minutes, the particle formation phase is over.

1.b.

Dissolve 2.5 g of MPTS in 100 g of isopropanol (AR) and stir for 10 minutes until homogeneous. Stir the titanium oxide sol at 22° C.

1.c.

The MPTS/isopropanol mixture (1.b) is added dropwise over the course of 6 hours to the titanium oxide sol (1.a). After about one fifth of the mixture from (b) has been added dropwise, the bath temperature of the sol is raised to 100° C.

1.d.

After 6 hours, surface-modified titanium oxide with a mean particle size of 12 nm is in this sol.

2. Synthesis of a Moulding of High Refractive Index 112 g of the sol described in 1.d are taken. Following the addition of 1 g of double-distilled water the sol is stirred at 100° C. for 1 h; then the solvent is removed. The resulting powder is again dissolved in 50 g of isopropanol (AR), and 25.77 g of TEGDMA, 6.16 g of bis-GMA and 0.65 g of MPTS, which has been subjected to acid hydrolysis beforehand, (with 1.5 times the stoichiometric amount) are added dropwise. The batch is stirred at 20° C. until homogeneous. The solvent is removed and, following the addition of 0.1382 g of AIBN, stirring is resumed until this mixture is homogeneous. The liquid precursor is placed into a mould (V=10 ml) and is thermally cured under a nitrogen atmosphere using a temperature programmed (according to procedure (c) of Example 15).

Properties: transparent moulding of n$_e$=1.5354 and Abbé number=43.8.

What is claimed is:

1. A process for preparing a moulding suitable for optical purposes, the process comprising the conjoint free-radical polymerization of a precondensate (A), which is derived from at least one hydrolytically condensable silane (a) having at least one free-radically polymerizable group X, and of a monomer (B) having at least two free-radically polymerizable groups Y, the numerical ratio of groups X to groups Y being not greater than 5:1, wherein the free radical polymerization is conducted in the presence of nanoscale particles (C) of a compound comprising a metal, in an amount of up to 50% by weight, based on (A)+(B)+(C).

2. A process according to claim 1, wherein the compound comprising a metal is a metal oxide.

3. A process according to claim 1, wherein the free-radical polymerization includes a thermal polymerization.

4. A process according to claim 3, wherein the thermal polymerization is preceded by a photopolymerization.

5. A process according to claim 1, wherein the silane (a) has the general formula (I):

X—R$^1$—SiR$^2$$_3$ (I)

in which X is CH$_2$=CR$^3$—COO (R$^3$=H or CH$_3$) or CH$_2$=CH, R$^1$ is a divalent hydrocarbon radical having 1 to 20 carbon atoms and the radicals R$^2$, identical or different from one another, are selected from the group consisting of alkoxy, aryloxy, acyloxy, alkylcarbonyl and halogen atoms.

6. A process according to claim 5, wherein the silane (a) includes a (meth)acryloyloxyalkyltrialkoxysilane.

7. A process according to claim 1, wherein the precondensate is derived from up to 95 mol-%, based on the monomeric components, of at least one hydrolytically condensable silane (b) without a group X of the formula (II)

R$^4$$_a$SiR$^2$$_{(4-a)}$ (II)

in which a=0, 1, 2 or 3;

the radicals R$^2$, identical or different from one another, are selected from the group consist of alkoxy, aryloxy, acyloxy, alkylcarbonyl and halogen atoms; and the radicals R$^4$, identical or different from one another, are hydrocarbon radicals having 1 to 20 carbon atoms which are unsubstituted or substituted by one or more substituents from the group consisting of halogen, alkoxy, OCOR$^5$, COOR$^5$, COR$^5$, N(R$^5$)$_2$ (R$^5$=alkyl having 1 to 6 carbon atoms or phenyl), NO$_2$, epoxy and hydroxyl.

8. A process according to claim 1, wherein the monomer (B) is selected from one or more compounds of the formula (III)

$$(CH_2=CR^3-COZ-)_n-A \quad (III)$$

in which n=2, 3 or 4;

Z=O or NH;

$R^3$=H or $CH_3$; and

A=an n-valent hydrocarbon radical having 2 to 30 carbon atoms, which can contain one or more heteroatoms between in each case two adjacent carbon atoms and which optionally has one or more substituents which are selected from halogen, alkoxy, hydroxyl, unsubstituted or substituted amino, $NO_2$, $OCOR^5$, $COOR^5$, $COR^5$ ($R^5=C_1-C_6$-alkyl or phenyl).

9. A process according to claim 8, wherein in formula (III) n=2, Z=O and A is a radical derived from an aliphatic diol, alkylene glycol, polyalkylene glycol or alkoxylated bisphenol.

10. A process according to claim 1, wherein the monomer (B) includes a monomer having at least one vinyl or allyl group Y.

11. A process according to claim 1, wherein the numerical ratio of groups X to groups Y is not greater than 2:1.

12. A process according to claim 1, wherein the numerical ratio of groups X to groups Y is not smaller than 1:20.

13. A process according to claim 2, wherein the nanoscale particles are those of $TiO_2$ or $ZrO_2$.

14. A moulding obtainable by the process of claim 1.

15. A moulding according to claim 14 which has a volume of a least 1 $cm^3$.

16. An optical component obtained from the moulding of claim 14, optionally after at least one of machining and processing.

17. An optical lens obtained from the moulding of claim 14, optionally after at least one of machining and processing.

18. A process according to claim 6, wherein the silane (a) includes 3-methacryloyloxypropyltrimethoxysilane.

19. A process according to claim 10, wherein the monomer (B) is selected from the group consisting of allyl(meth) acrylate, divinylbenzene and diallyl phthalate.

20. A process according to claim 11, wherein the numerical ratio of groups X to groups Y is not greater than 1:1.

21. A process according to claim 12, wherein the numerical ratio of groups X to groups Y is not smaller than 1:10.

22. A process for preparing a moulding suitable for optical purposes, the process comprising the conjoint free-radical polymerization of a precondensate (A), which is derived from at least one hydrolytically condensable silane (a) having at least one free-radically polymerizable group X, and of a monomer (B) having at least two free-radically polymerizable groups Y, the numerical ratio of groups X to groups Y being not greater than 5:1, wherein the free-radical polymerization includes a thermal polymerization; and the thermal polymerization is preceded by a photopolymerization conducted with UV radiation.

* * * * *